US009418061B2

(12) United States Patent
Ittycheriah et al.

(10) Patent No.: US 9,418,061 B2
(45) Date of Patent: Aug. 16, 2016

(54) PRIORITIZED INCREMENTAL ASYNCHRONOUS MACHINE TRANSLATION OF STRUCTURED DOCUMENTS

(75) Inventors: Abraham P. Ittycheriah, Brookfield, CT (US); Leiming Qian, Briarcliff Manor, NY (US); Robert Todd Ward, Elmsford, NY (US); Jian-Ming Xu, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 1947 days.

(21) Appl. No.: 11/956,403

(22) Filed: Dec. 14, 2007

(65) Prior Publication Data

US 2009/0158137 A1 Jun. 18, 2009

(51) Int. Cl.
*G06F 17/00* (2006.01)
*G06F 17/28* (2006.01)

(52) U.S. Cl.
CPC .......... *G06F 17/289* (2013.01); *G06F 17/2854* (2013.01); *G06F 17/2872* (2013.01)

(58) Field of Classification Search
CPC . G06F 17/289; G06F 17/227; G06F 17/2264; G06F 17/2854; G06F 17/2872
USPC ................. 715/239, 255, 264; 704/1, 5, 10, 4
See application file for complete search history.

(56) References Cited

U.S. PATENT DOCUMENTS

| 5,765,179 | A | * | 6/1998 | Sumita et al. ................. | 715/236 |
|---|---|---|---|---|---|
| 5,956,669 | A | | 9/1999 | Ozawa | |
| 6,208,956 | B1 | | 3/2001 | Motoyama | |
| 6,446,036 | B1 | | 9/2002 | Bourbonnais et al. | |
| 6,789,057 | B1 | * | 9/2004 | Morimoto et al. ................. | 704/2 |
| 7,080,320 | B2 | | 7/2006 | Ono | |
| 7,114,123 | B2 | | 9/2006 | Chen et al. | |
| 7,168,040 | B2 | | 1/2007 | Yamamoto et al. | |
| 7,987,176 | B2 | * | 7/2011 | Latzina et al. ................. | 707/713 |
| 2001/0027460 | A1 | | 10/2001 | Yamamoto et al. | |
| 2001/0029455 | A1 | | 10/2001 | Chin et al. | |
| 2002/0013790 | A1 | * | 1/2002 | Vandersluis .................. | 707/514 |
| 2003/0061022 | A1 | * | 3/2003 | Reinders ........................... | 704/2 |
| 2003/0110023 | A1 | | 6/2003 | Bangalore et al. | |
| 2003/0131052 | A1 | * | 7/2003 | Allan ............................ | 709/203 |
| 2003/0140316 | A1 | * | 7/2003 | Lakritz ......................... | 715/536 |
| 2003/0208352 | A1 | * | 11/2003 | Lee ................................. | 704/2 |
| 2003/0212605 | A1 | * | 11/2003 | Chin et al. ...................... | 705/26 |
| 2003/0212962 | A1 | * | 11/2003 | Chin et al. ..................... | 715/536 |
| 2004/0205671 | A1 | * | 10/2004 | Sukehiro et al. .............. | 715/532 |
| 2004/0230898 | A1 | | 11/2004 | Blakely et al. | |
| 2004/0237044 | A1 | * | 11/2004 | Travieso et al. .............. | 715/530 |
| 2005/0197826 | A1 | * | 9/2005 | Neeman ............................ | 704/2 |

(Continued)

*Primary Examiner* — Thu Huynh
(74) *Attorney, Agent, or Firm* — Daniel P. Morris; Ryan, Mason & Lewis, LLP

(57) ABSTRACT

Techniques for translating and presenting text in a structured document are provided. A structured document including text to be translated is received. At least one portion of the text to be translated is translated into at least one representation of translated text of a specific language. The translation is carried out in accordance with a prioritization schedule. Further, the representation of translated text is provided by at least first and second servers, the first server independently providing the representation of translated text of a first quality and the second server independently providing the representation of translated text of a second quality, the first quality being different than the second quality. As the text is translated, the representation of translated text is presented immediately when available.

20 Claims, 5 Drawing Sheets

(56) References Cited

U.S. PATENT DOCUMENTS

| | | |
|---|---|---|
| 2006/0217956 A1* | 9/2006 | Nagao et al. ............... 704/2 |
| 2007/0022114 A1* | 1/2007 | Hasegawa et al. ........... 707/6 |
| 2007/0124675 A1* | 5/2007 | Ban et al. .................. 715/703 |
| 2008/0028305 A1* | 1/2008 | Kim et al. .................. 715/273 |
| 2008/0120090 A1* | 5/2008 | Schurig ..................... 704/2 |
| 2008/0195372 A1* | 8/2008 | Chin et al. ................. 704/2 |
| 2008/0262828 A1* | 10/2008 | Och et al. .................. 704/3 |
| 2008/0281578 A1* | 11/2008 | Kumaran et al. ............ 704/2 |
| 2009/0234635 A1* | 9/2009 | Bhatt et al. ................ 704/2 |

* cited by examiner

100

200

500

PRIORITIZED INCREMENTAL ASYNCHRONOUS MACHINE TRANSLATION OF STRUCTURED DOCUMENTS

FIELD OF THE INVENTION

The present invention relates generally to electrical, electronic and computer arts, and, more particularly, to techniques for presenting translated text in a structured document.

BACKGROUND OF THE INVENTION

The internet continues to expand rapidly and internet users, worldwide, are able to browse the web faster than ever before. However, regardless of how quickly an internet user can access the web, language barriers continue to prevent the efficient dissemination of information.

The internet has attempted to address language issues by offering machine translation systems which translate a variety of input languages. However, these systems can be slow and inefficient. First, in conventional translation systems, an untranslated HyperText Markup Language (HTML) page is sent to a machine translation system that renders a translated page only after the page has been completely translated into a target language chosen by the user. This method is inefficient because it forces users to wait until translation of the entire page or pages has been completed. Many Internet users prefer skimming web pages for relevance prior to committed reading; thus, there may be instances wherein translation of the entire page is unnecessary and undesirable.

Next, conventional techniques fail to address the limiting inverse relationship between translation time and translation quality. Machine translation systems, regardless of the underlying technology used (e.g., rule-based or statistical model-based), usually trade off between translation time and quality. Generally speaking, a translation system can provide better quality translations given more time, more rules, or a more extensive statistical model. Conventional translation systems do not operate around this inherent limitation. Rather, current systems simply choose a static operating point and either sacrifice speed for quality or quality for speed.

Finally, conventional translation techniques do not apply an organized translation strategy. Current techniques indiscriminately translate web pages from start to finish. This is impractical for two reasons. First, a user may not want to wait for a complete translation of a web page. Rather, a user may want to see key words translated first. Secondly, sections of text within a structured document differ in terms of usefulness to the user. For example, navigation menus in a web page tend to relay key pieces of information in short spans of text. At the same time, large spans of text may include buried pieces of key information. Therefore, the indiscriminate, rapid translation of entire web pages lacks efficiency and only acts to decrease the overall quality of translations.

Accordingly, there exists a need for techniques for more efficiently translating and presenting text in a structured document which does not suffer from one or more problems found in conventional translation techniques.

SUMMARY OF THE INVENTION

An illustrative embodiment of the present invention meets the above-noted needs by providing techniques for efficiently translating text in a structured document. These techniques offer several advantages over conventional methodologies, including: (i) presenting partial translations of text immediately when available; (ii) overcoming the processing limitation of translation time versus translation quality by making multiple simultaneous translation requests to multiple translation servers of differing speeds and quality; and (iii) prioritizing the order in which text is translated to maximize translation speed and translation effectiveness.

In a first aspect of the invention, a method for presenting translated text in a structured document is provided. A structured document including text to be translated is received. At least one portion of the text to be translated is translated into at least one representation of translated text of a specific language. The translation is carried out in accordance with a prioritization schedule. Further, the representation of translated text is provided by at least first and second servers, the first server independently providing the representation of translated text of a first quality and the second server independently providing the representation of translated text of a second quality, the first quality being different than the second quality. As the text is translated, the representation of translated text is presented immediately when available. In one embodiment of the present invention, the progress of translation is outputted.

The representation of translated text may also be provided by a third server. The third server independently provides the at least one representation of translated text of a third quality, the third quality being different than the first quality and the second quality. More translation servers can be added in similar fashion.

In accordance with one embodiment of the present invention, the step of translating may comprise prioritizing the at least one portion of the text to be translated according to at least one characteristic of the text including at least one of length, composition, natural order, syntax, visual prominence, and structural tags of the text. The step of prioritizing may further comprise inserting JavaScript code into the at least one portion of the text to be translated. Additionally, the step of translating may also comprise sending a translation request to one or multiple translation servers in parallel.

In accordance with an additional embodiment of the present invention, the step of presenting may comprise replacing the at least one representation of translated text of the first quality with the at least one representation of translated text of the second quality, the second quality being higher than the first quality. The at least one representation of translated text of the first quality and the at least one representation of translated text of the second quality may be distinguished by at least one of color, font, or another visual cue.

The step of presenting may also be performed by at least one of visually and audibly. Further, the step of presenting may comprise outputting the at least one representation of translated text by mousing over the at least one portion of the text to be translated. Also, the step of presenting may comprise outputting the structured document and the at least one representation of translated text side-by-side.

In a second aspect of the invention, an apparatus for presenting translated text in a structured document comprises a memory, and at least one processor coupled to the memory. The at least one processor being operative: (i) to receive the structured document including text to be translated; (ii) to translate to a specific language at least one portion of the text to be translated into at least one representation of translated text in accordance with a prioritization schedule, wherein the at least one representation of translated text is provided by at least first and second servers, the first server independently providing the at least one representation of translated text of a first quality and the second server independently providing the at least one representation of translated text of a second quality, the first quality being different than the second quality; and (iii) to present the at least one representation of translated text immediately when available.

In a third aspect of the invention, an article of manufacture for presenting translated text in a structured document comprises a computer readable storage medium containing one or more computer programs, which when executed implement the steps of: (i) receiving the structured document including text to be translated; (ii) translating to a specific language at least one portion of the text to be translated into at least one representation of translated text in accordance with a prioritization schedule, wherein the at least one representation of translated text is provided by at least first and second servers, the first server independently providing the at least one representation of translated text of a first quality and the second server independently providing the at least one representation of translated text of a second quality, the first quality being different than the second quality; and (iii) presenting the at least one representation of translated text immediately when available.

In a fourth aspect of the invention, a system for presenting translated text in a structured document is provided. The system comprises a first server, at least a second server, and at least one processor operatively coupled to the first and at least second servers. The at least one processor being operative: (i) to receive the structured document including text to be translated; (ii) to translate to a specific language at least one portion of the text to be translated into at least one representation of translated text in accordance with a prioritization schedule, wherein the at least one representation of translated text is provided by at least first and second servers, the first server independently providing the at least one representation of translated text of a first quality and the second server independently providing the at least one representation of translated text of a second quality, the first quality being different than the second quality; and (iii) to present the at least one representation of translated text immediately when available.

These and other objects, features, and advantages of the present invention will become apparent from the following detailed description of illustrative embodiments thereof, which is to be read in connection with the accompanying drawings.

DETAILED DESCRIPTION OF THE INVENTION

The present invention will be described in the context of illustrative embodiments of an exemplary web page translation system comprising multiple translation servers of differing speed and quality. It should be understood, however, that the invention is not limited to use with any particular translation system or web page. Rather, the invention is generally applicable to any translation technique that presents prioritized, incremental, and asynchronous machine translations of structured documents.

The term "browser client" as used herein is intended to be construed broadly so as to encompass, by way of example and without limitation, any client used to browse the internet. Examples of browser clients include, Internet Explorer® (a registered trademark of Microsoft Corporation) and Mozilla FireFox® (a registered trademark of Mozilla Foundation).

The term "translation server" as used herein is intended to be constructed broadly so as to compass, by way of example and without limitation, any translation engine that can receive a text string in source language and return a text string in the target language. Examples of translation servers include, but are not limited to, translation software products from IBM, Systran, etc. It should be noted that the method described in this application can use any existing translation servers without modification.

The term "mousing over" as used herein is intended to be construed broadly so as to encompass, by way of example and without limitation, a user interface technique of placing a cursor over a portion of graphical output to trigger additional graphical output.

The term "structured document" as used herein is intended to be construed broadly so as to encompass, by way of example and without limitation, any text that is structured. An HTML web page is one type of structured document. It should be understood that embodiments of this invention do not mandate how the document structure is generated, it simply assumes that a structured document is available as input and the structure is known.

Figure 1:
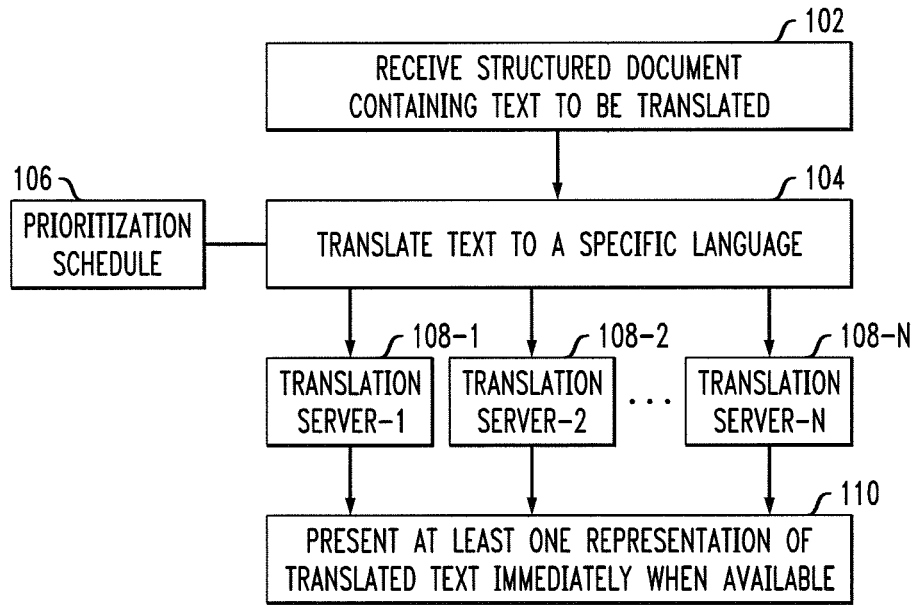
FIG. 1 is a flow diagram illustrating an exemplary methodology for presenting translated text in a structured document, in accordance with an embodiment of the present invention.

Referring initially to FIG. 1, a flow diagram illustrates an exemplary methodology 100 for presenting translated text in a structured document, in accordance with an embodiment of the present invention. Methodology 100 begins at step 102 where a structured document containing text to be translated is received. In an illustrative embodiment, a user via a browser client (e.g., a modified translation web browser) requests that a particular web document (e.g., web page) be translated. The request is directed to an application server. Upon receiving the request, the application server, acting as a proxy, retrieves the web page, inserts necessary customized JavaScript® (a registered trademark of Sun Microsystems, Inc.) code, and feeds the modified page back to the browser client.

At step 104, the text of the web page is translated to a specific language designated by the user. Initially, the web page is rendered by the browser client, at which point all text is in the original source language. In an illustrative embodiment, the browser client utilizes the structural information of the document, or some alternative criteria, to partition the text of the document into translation units. The translation units are ordered according to level of importance, as may be specified by the user, and organized in the form of a prioritization schedule 106. In an additional embodiment, the ordered translation units are placed in a prioritization queue.

Prioritizing the translation of text maximizes efficiency in two ways. First, server usage is reduced. Since text is translated in the order of importance, users may terminate a translation prior to completion of the translation if a user decides that a complete translation is unnecessary. Second, internet users can save time and browse the web more efficiently. For instance, by viewing the most important text first, a user can quickly determine if a complete translation is worth waiting for. If the initial translations return text that is deemed irrelevant by the user, the user can terminate the translation and browse elsewhere.

There are various ways which may be employed to determine translation priority. In one illustrative technique, priority is determined using format-independent strategies. This may include, for example, prioritizing according to: (1) length and composition of the translation units (e.g., longer spans of text presumably convey more information and are higher-priority); and (2) the natural order of the translation units (e.g., the order in which text of a web page is presented may represent the order of importance). One simple prioritization strategy is to use the natural order of the nodes provided by the document parser/renderer. For visual formats such as HTML, this is usually an adequate strategy since users tend to read the output in the same order.

In a second illustrative technique, priority is determined using format-specific strategies. This may include, for example, prioritizing according to: (1) visual prominence (e.g., text in the center of the screen, large blocks of text, bold faced, etc), which may indicate higher-priority; (2) lack of visual prominence (e.g., text that is not immediately visible without scrolling, text that is hardly visible, or text that is grayed-out), which may indicate lower-priority; and (3) lack of syntactic structure (e.g., a single word), which, depending on location, may or may not indicate higher-priority (e.g., single words in a main heading versus single words in a secondary heading). In an additional embodiment, text that lacks syntactic structure may be sent to a special-purpose translation engine for processing.

Preferably, priority ultimately determines which translated text an internet user will see first. Many different priority strategies may be developed, some of which were described herein above, and these strategies may be applied to the present invention, either individually or in combination, to maximize translation efficiency. Further, a user interface may be implemented to give internet users the ability to select from multiple predefined strategies, or as a means of entering their own prioritization strategy. It should be understood that the invention is not limited to any specific prioritization strategy; rather, the invention assumes such a prioritization strategy (or multiple prioritization strategies), if employed, is available for use.

Once the text of the web page is partitioned and prioritized, page translation can be initiated. In an illustrative embodiment, a fixed number of translation pipelines, each including a corresponding translation server, are utilized (108-1, . . . 108-N). For each translation unit, multiple asynchronous translation requests may be issued by the browser client to available translation servers that operate at different performance levels (e.g., speed and quality levels). It is to be appreciated that the number of servers used for performing the requested translation is not limited by the invention. Increasing the number of servers used in performing the translation may increase the speed and/or quality of the translation.

The translation servers may be configured such that the fastest translation server is the first to return a translation. The first translation may be poor in quality compared to subsequent translations; however, the first translation provides the user with a quick and coarse view of the web page so that the user can more quickly assess the relevance of the content presented by the page. The first translation is preferably replaced, in whole or in part, as subsequent, higher-quality translations from slower servers begin to arrive. Ideally, higher-quality translations are not replaced by lower-quality translations. If a user waits long enough, the entire web page will contain translations from the best-quality translation server. If a user is under a time constraint, the user can, at a minimum, appreciate the general content of a web page by reading initial translations. It should be noted that after a user makes the initial request to translate a web page, no user intervention is needed for the remainder of the translation process.

As translations from the translation servers become available, the translations are presented to the user immediately (step 110). Translations may be presented to the user visually and/or audibly via the browser client. In an illustrative embodiment, the original text of the web page is "morphed" into translated text and the translated text is morphed into subsequent translations. This "in-place" rendering technique provides a means of preserving the original web page layout. Also, in-place rendering can be visually pleasing. In order to differentiate between the multiple translation outputs for the same text, different colors, font-faces, sounds, or other presentation techniques can be used.

In an additional embodiment, a user interface that allows a user to view all previous translations for a piece of text may be implemented. This is particularly useful, for example, in the unlikely, but possible, event that a faster translation server produces a better quality translation output than a slower translation server. In this instance, it is vital to make all translation results accessible to the user. This helps the user determine if the displayed text is the most accurate translation. One method of implementing this feature is to use a mouse-over tooltip that displays not only the original text before translation (for bilingual speakers), but all previously received translations. Preferably, the translation from the presumed best quality translation server (engine) will be displayed as the default translation. However, if a user feels that the default translation is not the best quality, the user may, in accordance with another aspect of the invention, designate a previously received translation as the default translation via the tooltip feature.

It should be appreciated that methodologies for finding the best translation (e.g., in terms of translation accuracy or some other criteria) among a set of candidates are known by those skilled in the art and therefore will not be described herein. However, a simple assumption may be made that translations from slower servers should have better quality.

In an exemplary embodiment, the browser client also includes customized forward and backward navigation buttons similar to those found in conventional web browsers. Further, all mouse clicks in the translated page are intercepted and the targeted page is translated within the same interface. The navigation buttons can be used to move back and forth between pages within the interface.

Figure 2:
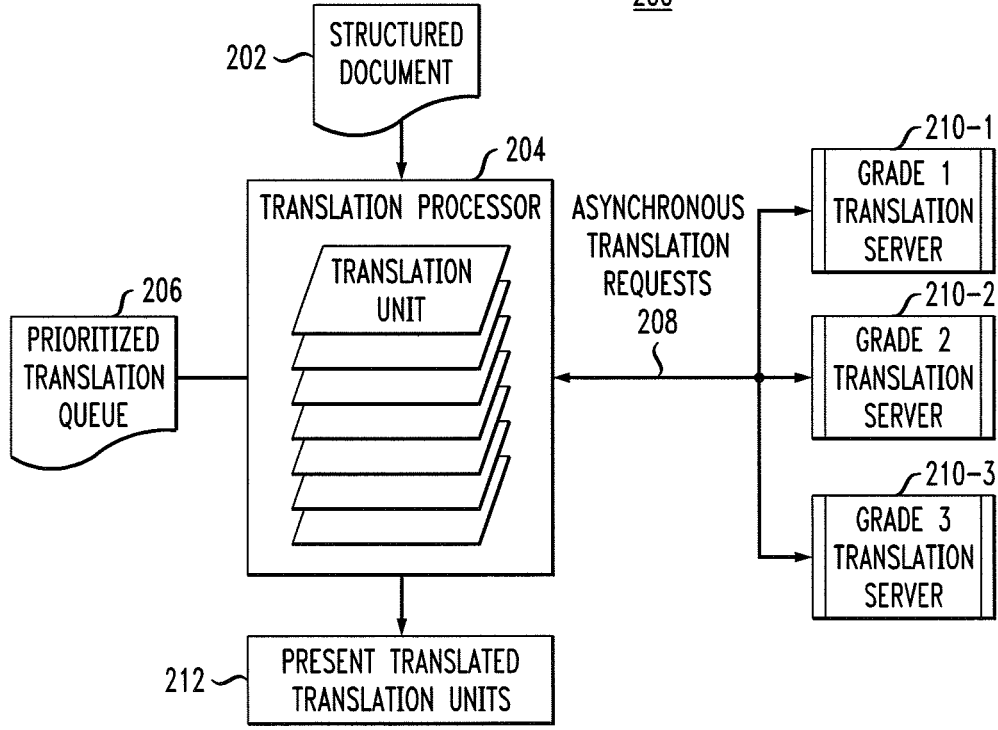
FIG. 2 is a block diagram illustrating a system for implementing the methodology of FIG. 1, in accordance with an embodiment of the present invention.

Referring now to FIG. 2, a block diagram illustrates an exemplary system 200 for implementing the methodology of FIG. 1, in accordance with an embodiment of the present invention. System 200 receives a request from an internet user to translate a structured document 202. In response to the request, a translation processor 204 retrieves the structured document 202. The processor 204 partitions the document into a plurality of translation units. The translation units are prioritized and placed in a prioritized translation queue 206.

In accordance with the queue 206, asynchronous translation requests 208 to translate the units are sent, preferably in parallel, to multiple translation servers of varying translation grades (210-1, ... 210-3). In this example, a grade 1 translation server 210-1 provides fast, but low-quality, translations. A grade 2 translation server 210-2 provides moderate-quality translations at a moderate speed. And, a grade 3 translation server 210-3 provides high-quality translations at a slow speed. As the servers output translated text, the translation processor 204 immediately presents the translated translation units (212) to the user via a browser client. When presenting the translations, the translation processor 204 preferably replaces lower-quality translations with higher-quality translations, as discussed above.

Figure 3:
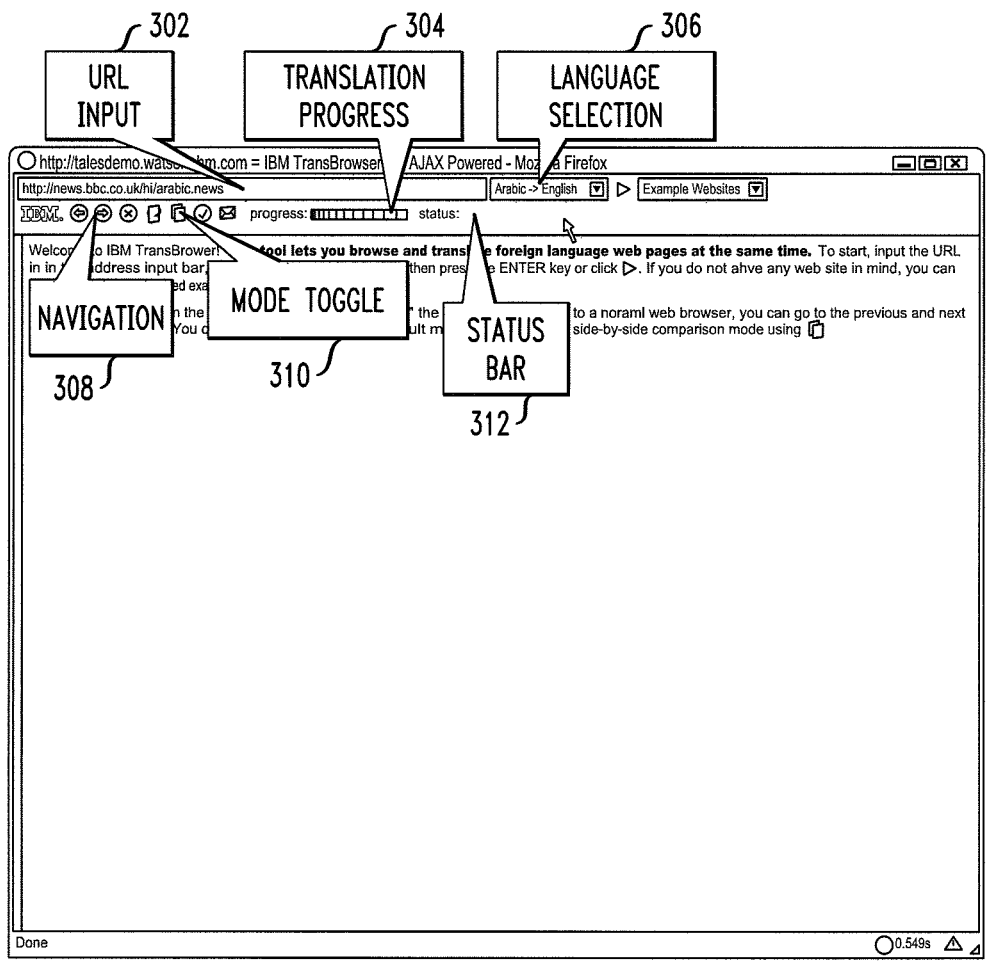
FIG. 3 is a diagram illustrating an exemplary user interface for a translation system, in accordance with an embodiment of the present invention.

Referring now to FIG. 3, an exemplary user interface 300 for a translation system is shown, in accordance with an embodiment of the present invention. User interface 300 resembles a conventional web browser. However, the user interface includes additional controls for translation. In an exemplary embodiment, the user interface 300 includes a uniform resource locator (URL) input 302, a translation progress indicator 304, a language selection window 306, navigation buttons 308, a translation mode toggle button 310, and a status bar 312. It is to be appreciated that the invention is not limited to the particular translation features and controls shown. The URL input 302 may be used to specify a web address on the internet. The translation progress indicator 304 shows the translation progress of the translation servers. Progress may be shown, for example, by displaying the translation status corresponding to each server or by displaying translation progress for the fastest server. Alternative translation progress indication methodologies are contemplated, as will become apparent to those skilled in the art given the teachings herein. The language selection window 306 allows a user to select a translation language pair. The navigation buttons 308 allow a user to navigate to and from previously viewed web pages. The translation mode toggle button 310 allows a user to switch between different translation modes, such as, original text, translated text, or original text and translated text side-by-side. The status bar 312 indicates the status of the translation (e.g., "Translating," "Translation completed," or "Error").

Figure 4:
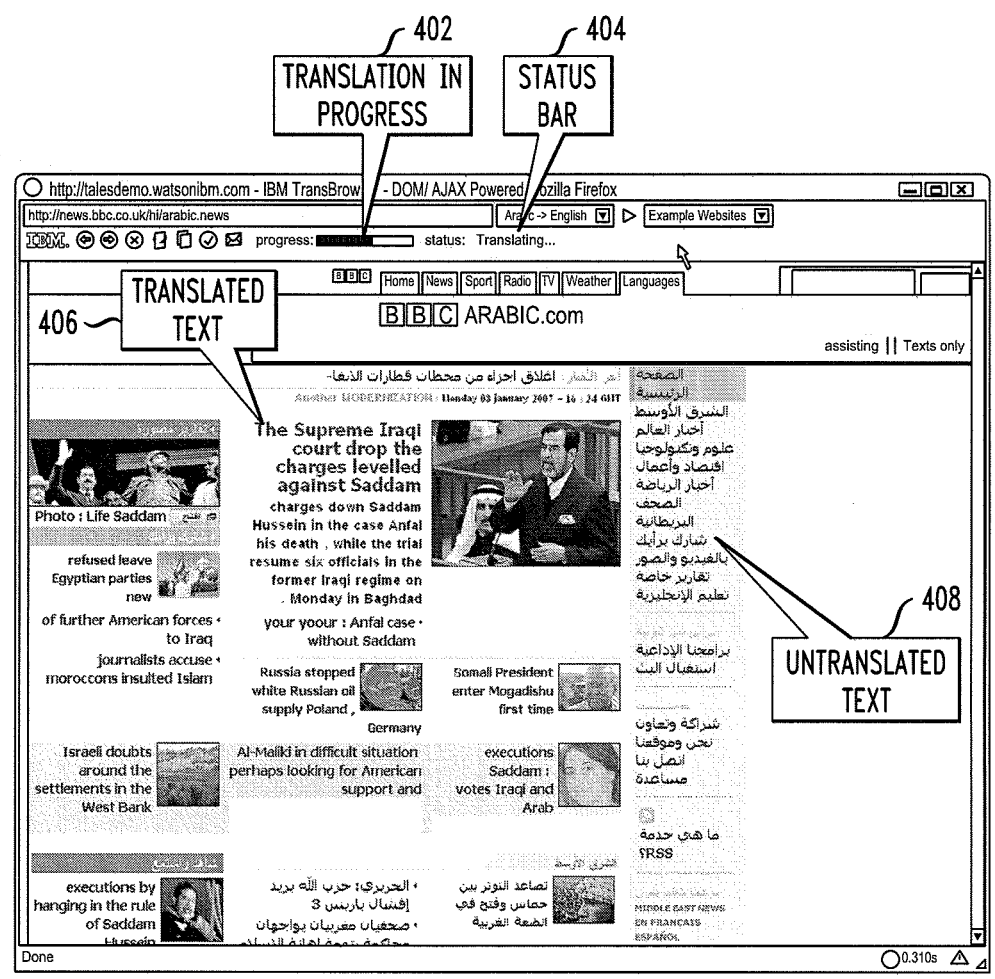
FIG. 4 is an illustrative user interface depicting a partially translated structured document, in accordance with an embodiment of the present invention.

FIG. 4 is an illustrative user interface 400 depicting a partially translated structured document, in accordance with an embodiment of the present invention. A translation progress indicator 402 shows a meter indicating partial translation of a web page. A status bar 404 indicates that the web page is in the process of being translated (e.g., "Translating . . . "). Portions of the web page designated as containing text with high translation priority (406) are preferably translated first and portions of the web page designated as containing text of lower priority (408) are translated last (shown in the figure as untranslated text).

Figure 5:
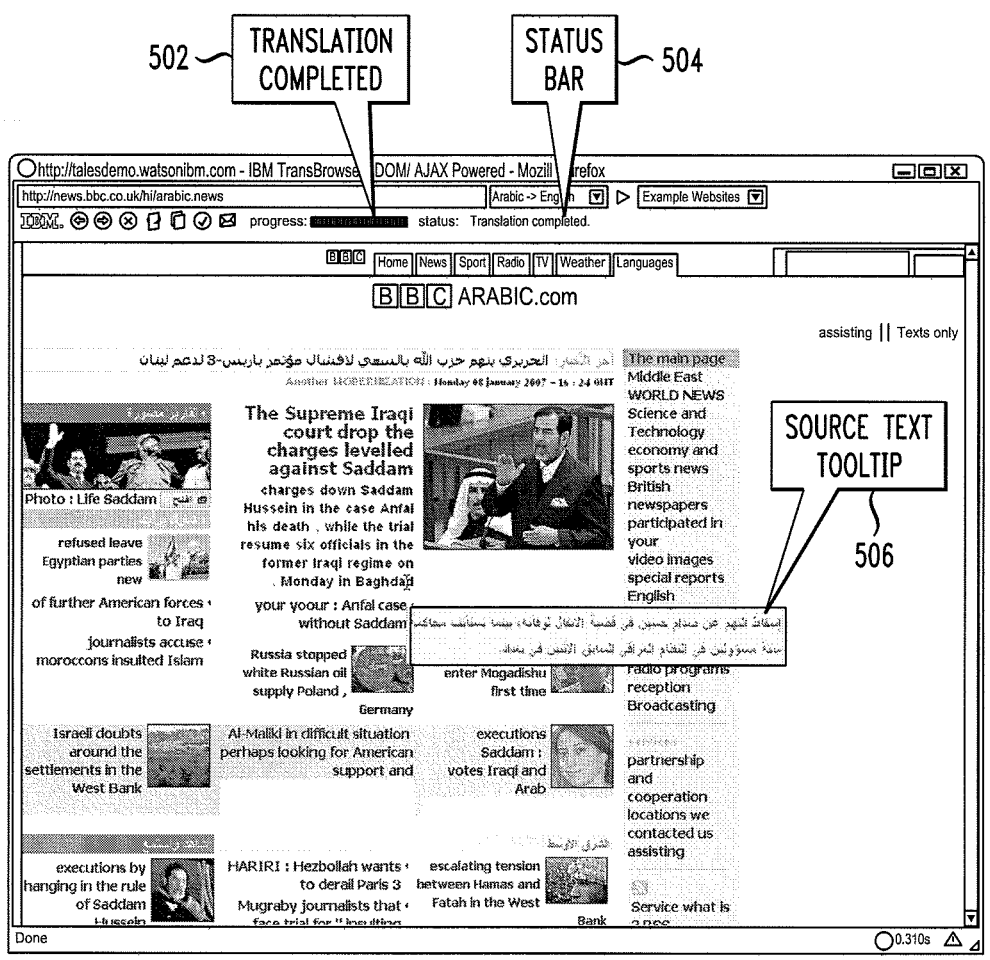
FIG. 5 is an illustrative user interface implemented as a web page which incorporates a feature, referred to herein as a "tooltip" option, in accordance with an embodiment of the present invention.

FIG. 5 depicts an illustrative user interface 500 implemented as a web page which incorporates a feature, referred to herein as a "tooltip" option, in accordance with an embodiment of the present invention. A translation progress indicator 502 shows a full meter which indicates that the web page has been fully translated. Further, a status bar 504 indicates, "Translation Completed." In this illustrative embodiment, a user can view the original, untranslated source text by mousing over the translated text, in accordance with the tooltip feature. More particularly, as the user places the mouse cursor over a section of translated text, a source text tooltip pop-up window 506 appears. In this example, the source text tooltip contains the original, untranslated text; however, this pop-up technique can be used to show previously presented translations for a section of translated text. Further, the tooltip window may be programmed to give users the option to select which translations they want displayed as the default translation. Other techniques for presenting the original source text to the user are similarly contemplated given the teachings herein.

Figure 6:
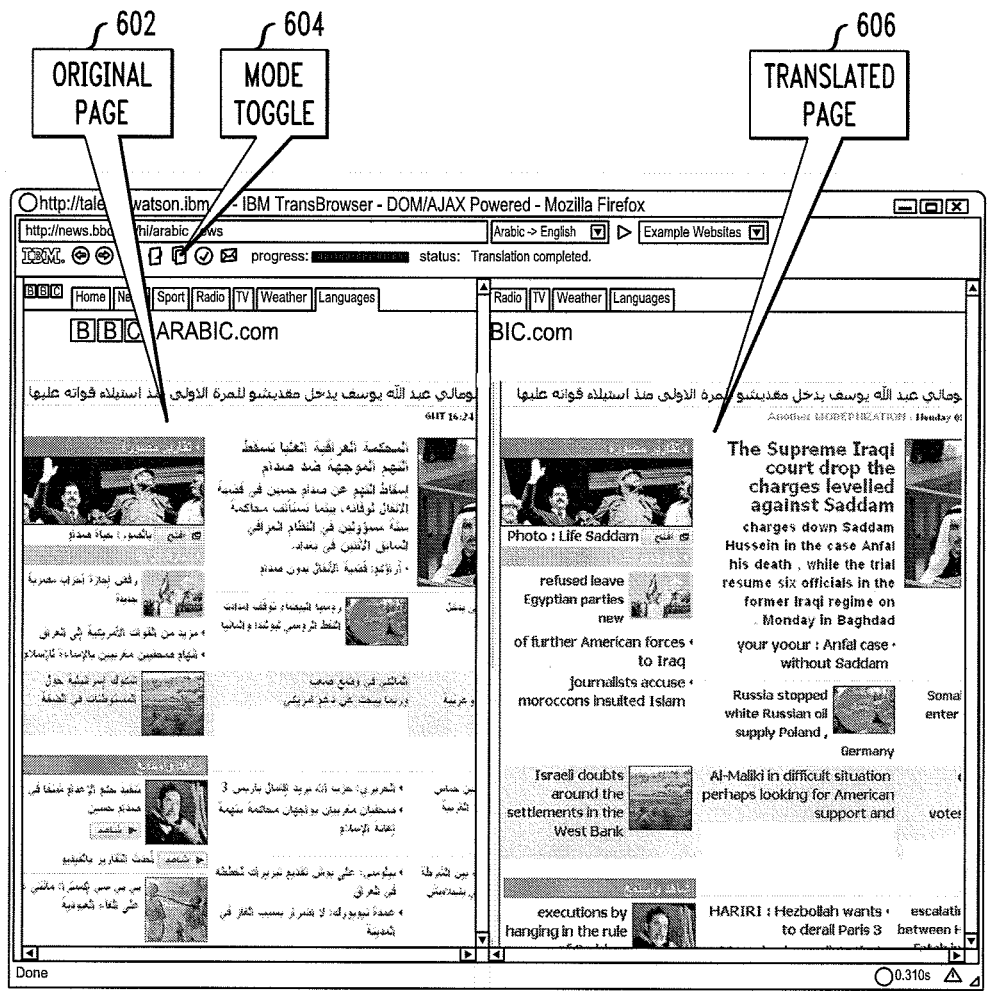
FIG. 6 is an illustrative user interface depicting, side-by-side, untranslated and translated text of a structured document, in accordance with an embodiment of the present invention.

Referring now to FIG. 6, a user interface 600 depicts, side-by-side, untranslated and translated text of a structured document, in accordance with an embodiment of the present invention. In this embodiment, a user can view the original web page 602, the translated page 606, or both side-by-side, by using a translation mode toggle button 604, or alternative means. The untranslated and translated text may be presented in separate windows as shown, although other presentation methodologies may be used.

Figure 7:
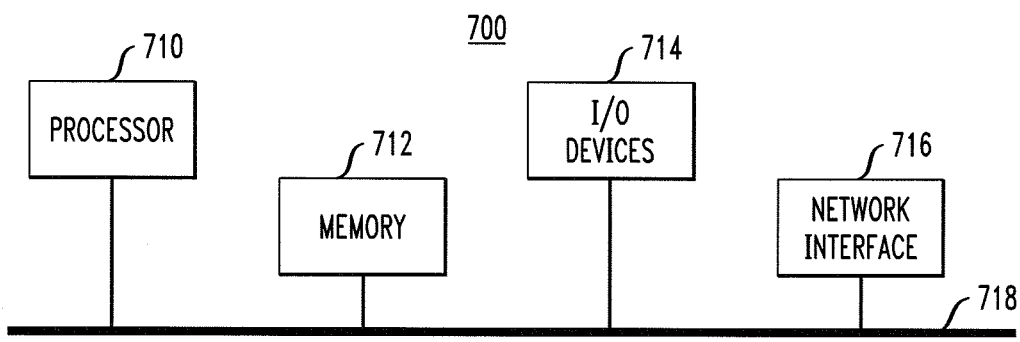
FIG. 7 is a block diagram illustrating an exemplary hardware implementation of a computing system in which one or more components/methodologies of the invention may be implemented, in accordance with an embodiment of the present invention.

FIG. 7 is a block diagram illustrates an exemplary hardware implementation of a computing system 700 in which one or more components/methodologies of the invention (e.g., components/methodologies described in the context of FIGS. 1-6) may be implemented, according to an embodiment of the present invention.

As shown, the techniques for presenting translated text in a structured document may be implemented in accordance with a processor 710, a memory 712, I/O devices 714, and a network interface 716, coupled via a computer bus 718 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Still further, the phrase "network interface" as used herein is intended to include, for example, one or more transceivers to permit the computer system to communicate with another computer system via an appropriate communications protocol.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A method for presenting translated text in a browser client, the method comprising the steps of:

the browser client receiving the structured document including text to be translated;

the browser client partitioning the structured document into a plurality of translation units;

the browser client providing a user interface that enables a user to select one of a plurality of different prioritization schemes that are utilized to determine a prioritized order for translating the plurality of translation units, wherein the plurality of different prioritization schemes include (i) a format-independent prioritization scheme that prioritizes the plurality of translation units according to at least one of a length of the plurality of translation units and a natural order of the plurality of translation units in the structured document and (ii) a format-specific prioritization scheme that prioritizes the plurality of translation units based on a visual prominence and lack of visual prominence of each of the plurality of translation units;

the browser client receiving an indication of a user-selected one of the prioritization schemes;

the browser client determining an order by priority in which to translate the plurality of translation units based on the user-selected prioritization scheme, and placing the plurality of translation units in a priority queue in the determined order by priority;

the browser client sequentially accessing the plurality of translation units from the priority queue in the determined order by priority, and sending each accessed translation unit to each of a plurality of translation servers which operate at different translation performance levels, the plurality of translation servers comprising first and second translation servers, wherein the first and second translation servers are operative to translate each translation unit to a specific language in the order that the translation units are received from the browser client, wherein translating the translation units comprises translating a given translation unit into at least one representation of translated text by the first translation server and the second translation server of the plurality of translation servers, the first translation server independently providing the at least one representation of translated text of a first quality and the second translation server independently providing the at least one representation of translated text of a second quality, the first quality being different than the second quality;

the browser client presenting the at least one representation of translated text for the given translation unit within the structured document immediately when the at least one representation of translated text is received by the browser client from at least one of the plurality of translation servers; and the browser client terminating the translation of the plurality of translation units, prior to completing the translation of all of the plurality of translation units, in response to a user command to terminate the translation of the plurality of translation units.

2. The method of claim 1, wherein the at least one representation of translated text is provided to the browser client by a third server of the plurality of translation servers, the third server independently providing the at least one representation of translated text of a third quality, the third quality being different than the first quality and the second quality.

3. The method of claim 1, wherein the plurality of different prioritization schemes include schemes that prioritize the plurality of translation units according to one or more text characteristics including length, composition, syntax, and structural tags of the text.

4. The method of claim 1, wherein the step of presenting further comprises the browser client replacing the at least one representation of translated text of the first quality with the at least one representation of translated text of the second quality, the second quality being higher than the first quality.

5. The method of claim 4, wherein the at least one representation of translated text of the first quality and the at least one representation of translated text of the second quality are distinguished by at least one of color, font, and sound.

6. The method of claim 4, wherein the step of replacing the at least one representation of translated text of the first quality with the at least one representation of translated text of the second quality further comprises outputting the at least one representation of translated text of the first quality responsive to mousing over the at least one representation of translated text of the second quality.

7. The method of claim 4, wherein the step of replacing the at least one representation of translated text of the first quality with the at least one representation of translated text of the second quality further comprises replacing the at least one representation of translated text of the second quality with the at least one representation of translated text of the first quality responsive to a user selection.

8. The method of claim 1, wherein the step of presenting is performed at least one of visually and audibly.

9. The method of claim 1, wherein the step of presenting further comprises outputting the at least one representation of translated text by mousing over the at least one portion of the text to be translated.

10. The method of claim 1, further comprising the step of the browser client outputting an indication of progress of the translation by the first server and the second server.

11. The method of claim 1, wherein the step of sending comprises sending each accessed translation unit to the at least first and second servers in parallel.

12. The method of claim 1, wherein the step of presenting comprises the browser client displaying the structured document and the at least one representation of translated text side-by-side.

13. The method of claim 1, wherein the step of receiving the structured document including text to be translated further comprises the browser client receiving JavaScript code inserted by a proxy server into at least one portion of the text to be translated.

14. The method of claim 1, wherein the step of presenting further comprises outputting the given translation unit responsive to mousing over the at least one representation of translated text for the given translation unit.

15. The method of claim 1, wherein the step of receiving the structured document including the text to be translated comprises the browser client presenting the structured document including the text to be translated.

16. The method of claim 15, wherein the step of presenting the at least one representation of translated text for the given translation unit comprises the browser client replacing the given translation unit with the at least one representation of translated text while presenting the structured document.

17. An apparatus for presenting translated text in a browser client, the apparatus comprising:
- a memory; and
- at least one processor coupled to the memory and operative to implement the browser client, the browser client being operative:
  - to receive a structured document including text to be translated;
  - to partition the structured document into a plurality of translation units;

to provide a user interface that enables a user to select one of a plurality of different prioritization schemes that are utilized to determine a prioritized order for translating the plurality of translation units, wherein the plurality of different prioritization schemes include (i) a format-independent prioritization scheme that prioritizes the plurality of translation units according to at least one of a length of the plurality of translation units and a natural order of the plurality of translation units in the structured document and (ii) a format-specific prioritization scheme that prioritizes the plurality of translation units based on a visual prominence and lack of visual prominence of each of the plurality of translation units;

to receive an indication of a user-selected one of the prioritization schemes;

to determine an order by priority in which to translate the plurality of translation units based on the user-selected prioritization scheme, and place the plurality of translation units in a priority queue in the determined order by priority;

to sequentially access the plurality of translation units from the priority queue in the determined order by priority, and send each accessed translation unit to each of a plurality of translation servers which operate at different translation performance levels, the plurality of translation servers comprising first and second translation servers, wherein the first and second translation servers are operative to translate each translation unit to a specific language in the order that the translation units are received from the browser client, wherein translating the translation units comprises translating a given translation unit into at least one representation of translated text by the first translation server and the second translation server of the plurality of translation servers, the first translation server independently providing the at least one representation of translated text of a first quality and the second translation server independently providing the at least one representation of translated text of a second quality, the first quality being different than the second quality;

to present the at least one representation of translated text for the given translation unit within the structured document immediately when the at least one representation of translated text is received by the browser client from at least one of the plurality of translation servers; and to terminate the translation of the plurality of translation units, prior to completing the translation of all of the plurality of translation units, in response to a user command to terminate the translation of the plurality of translation units.

18. The apparatus of claim 17, wherein the plurality of different prioritization schemes includes schemes that prioritize the plurality of translation waits according to one or more text characteristics including composition, syntax, and structural tags of the text.

19. An article of manufacture for presenting translated text in a browser client, the article comprising:

a non-transitory computer-readable storage medium containing one or more computer programs, which when executed implement the browser client, the browser client being operative to perform the steps of:

receiving the structured document including text to be translated;

partitioning the structured document into a plurality of translation units;

providing a user interface that enables a user to select one of a plurality of different prioritization schemes that are utilized to determine a prioritized order for translating the plurality of translation units wherein the plurality of different prioritization schemes include (i) a format-independent prioritization scheme that prioritizes the plurality of translation units according to at least one of a length of the plurality of translation units and a natural order of the plurality of translation units in the structured document and (ii) a format-specific prioritization scheme that prioritizes the plurality of translation units based on a visual prominence and lack of visual prominence of each of the plurality of translation units;

receiving an indication of a user-selected one of the prioritization schemes;

determining an order by priority in which to translate the plurality of translation units based on the user-selected prioritization scheme, and placing the plurality of translation units in a priority queue in the determined order by priority;

sequentially accessing the plurality of translation units from the priority queue in the determined order by priority, and sending each accessed translation unit to each of a plurality of translation servers which operate at different translation performance levels, the plurality of translation servers comprising first and second translation servers, wherein the first and second translation servers are operative to translate each translation unit to a specific language in the order that the translation units are received from the browser client, wherein translating the translation units comprises translating a given translation unit into at least one representation of translated text by the first translation server and the second translation server of the plurality of translation servers, the first translation server independently providing the at least one representation of translated text of a first quality and the second translation server independently providing the at least one representation of translated text of a second quality, the first quality being different than the second quality;

presenting the at least one representation of translated text for the given translation unit within the structured document immediately when the at least one representation of translated text is received by the browser client from at least one of the plurality of translation servers; and terminating the translation of the plurality of translation units, prior to completing the translation of all of the plurality of translation units, in response to a user command to terminate the translation of the plurality of translation units.

20. A system for presenting translated text in a browser client, the system comprising:

a plurality of translation servers; and at least one processor operatively coupled to the plurality of translation servers, the processor being operative to implement the browser client, the browser client being operative:

to receive a structured document including text to be translated;

to partition the structured document into a plurality of translation units;

to provide a user interface that enables a user to select one of a plurality of different prioritization schemes that are utilized to determine a prioritized order for translating the plurality of translation units, wherein the plurality of different prioritization schemes include (i) a format-independent prioritization scheme that prioritizes the plurality of translation units according to at least one of a length of the plurality of translation units and a natural order of the plurality of translation units in the structured document and (ii) a format-specific prioritization scheme that prioritizes the plurality of translation units based on a visual prominence and lack of visual prominence of each of the plurality of translation units;

to receive an indication of a user-selected one of the prioritization schemes;

to determine an order by priority in which to translate the plurality of translation units based on the user-selected prioritization scheme, and place the plurality of translation units in a priority queue in the determined order by priority;

to sequentially access the plurality of translation units from the priority queue in the determined order by priority, and send each accessed translation unit to each of the plurality of translation servers which operate at different translation performance levels, the plurality of translation servers comprising first and second translation servers, wherein the first and second translation servers are operative to translate each translation unit to a specific language in the order that the translation units are received from the browser client, wherein translating the translation units comprises translating a given translation unit into at least one representation of translated text by the first translation server and the second translation server of the plurality of translation servers, the first translation server independently providing the at least one representation of translated text of a first quality and the second translation server independently providing the at least one representation of translated text of a second quality, the first quality being different than the second quality;

to present the at least one representation of translated text for the given translation unit within the structured document immediately when the at least one representation of translated text is received by the browser client from at least one of the plurality of translation servers; and to terminate the translation of the plurality of translation units, prior to completing the translation of all of the plurality of translation units, in response to a user command to terminate the translation of the plurality of translation units.

\* \* \* \* \*